(12) United States Patent
Berbach et al.

(10) Patent No.: US 12,380,497 B2
(45) Date of Patent: Aug. 5, 2025

(54) METHOD AND APPARATUS FOR COMPUTER-IMPLEMENTED MONITORING OF ENERGY PRODUCTION OF A RENEWABLE ENERGY GENERATING SYSTEM

(71) Applicant: Siemens Gamesa Renewable Energy A/S, Brande (DK)

(72) Inventors: Julien Berbach, Hamburg (DE); Bert Gollnick, Hamburg (DE); Jon Gould, Hamburg (DE); Fabian Walz, Buchholz (DE)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 172 days.

(21) Appl. No.: 17/781,556

(22) PCT Filed: Dec. 8, 2020

(86) PCT No.: PCT/EP2020/084982
§ 371 (c)(1),
(2) Date: Jun. 1, 2022

(87) PCT Pub. No.: WO2021/116058
PCT Pub. Date: Jun. 17, 2021

(65) Prior Publication Data
US 2022/0414772 A1    Dec. 29, 2022

(30) Foreign Application Priority Data

Dec. 10, 2019    (EP) ..................................... 19214690

(51) Int. Cl.
*G06Q 40/04*    (2012.01)
*G06Q 50/06*    (2024.01)

(52) U.S. Cl.
CPC ............. *G06Q 40/04* (2013.01); *G06Q 50/06* (2013.01)

(58) Field of Classification Search
CPC ......... G06Q 40/04; G06Q 50/06; G06Q 40/12
See application file for complete search history.

(56) References Cited

U.S. PATENT DOCUMENTS 9,111,321 B2    8/2015    Bullen et al.
10,380,661 B2 *   8/2019    Ono ...................... G06Q 30/018
(Continued)

FOREIGN PATENT DOCUMENTS

CA           2736219 A1 *   8/2012   ............. H02J 15/00
WO      2013/164775 A1    11/2013

OTHER PUBLICATIONS

Jossi, Frank, Could Blcokchain Make it Easier to buy and sell renewable energy certificates? www.energynews.com Apr. 2020.*
(Continued)

*Primary Examiner* — Richard C Weisberger
(74) *Attorney, Agent, or Firm* — Schmeiser, Olsen & Watts, LLP

(57) ABSTRACT

A method for a renewable energy generating system is provided. The renewable energy generating system includes the following steps: —determining, by a first energy meter, a produced energy amount of the renewable energy generating system in the predetermined period of time; —verifying the produced energy amount of the renewable energy generating system in the predetermined period of time; —issuing, by a computing unit, an energy certificate for the renewable energy generating system for the predetermined period of time, where the energy certificate at least comprises a time stamp indicating the predetermined period of time, an identifier indicating the one or group of renewable energy generators having produced the energy amount, and the produced energy amount; —encrypting, by the comput-
(Continued)

ing unit, the energy certificated; and —adding, by the computing unit, the encrypted energy certificate to a block of a blockchain or a distributed ledger application as a digital output.

13 Claims, 3 Drawing Sheets

(56) References Cited

U.S. PATENT DOCUMENTS

| | | | |
|---|---|---|---|
| 10,649,429 B2* | 5/2020 | Orsini | G06Q 50/06 |
| 2012/0253711 A1 | 10/2012 | Ono et al. | |
| 2015/0021999 A1* | 1/2015 | Rodriguez | H02J 3/008 |
| | | | 307/52 |
| 2016/0125557 A1* | 5/2016 | Rosner | H01L 31/02021 |
| | | | 705/7.23 |
| 2017/0103468 A1 | 4/2017 | Orsini et al. | |
| 2018/0299852 A1* | 10/2018 | Orsini | G06Q 50/06 |
| 2019/0086235 A1* | 3/2019 | Cui | H04L 63/0435 |

OTHER PUBLICATIONS

A survey of anomaly detection methods for power grids Srinidhi Madabhushi[1]. Rinku Dewri[1] Published online: Jul. 8, 2023 The Author(s), under exclusive licence to Springer-Verlag GmbH, DE 2023.*

International Search Report & Written Opinion for PCT/EP2020/084982 issued Feb. 16, 2021.

* cited by examiner

METHOD AND APPARATUS FOR COMPUTER-IMPLEMENTED MONITORING OF ENERGY PRODUCTION OF A RENEWABLE ENERGY GENERATING SYSTEM

CROSS-REFERENCE TO RELATED APPLICATIONS

This application claims priority to PCT Application No. PCT/EP2020/084982, having a filing date of Dec. 8, 2020, which claims priority to EP Application No. 19214690.0, having a filing date of Dec. 10, 2019, the entire contents both of which are hereby incorporated by reference.

FIELD OF TECHNOLOGY

The following relates to a method and an apparatus for computer-implemented monitoring of energy production of a renewable energy generating system, where the renewable energy generating system comprises one or a group of more renewable energy generators.

BACKGROUND

Renewable energy produced by a renewable energy generating system, such as a windfarm comprising one or more wind turbines, solar generators, and so on, is called green energy. Based on the produced energy over the year, green energy certificates, also referred to as Guarantees of Origin (GoO) are issued to customers by a trading company, called utility. The green energy certificates are issued for produced energy for a month generated in an earlier month. Currently, a certificate has a size equal to 1 MWh of renewable energy. A disadvantage of the certificate system as of today is that it is possible to label energy produced from non-renewable energy sources (sometimes called as grey energy) as green energy by simply buying green energy certificates of an equal amount. As it is not possible to trace back the origin to a specific renewable energy generating system, the proof that a consumer is fully supplied by green energy is thus only possible on paper today.

US 2017/0 103 468 A1 discloses a method for peer-to-peer settlement for participation in energy and computation supply in a distributed network. In the electric power grid network, energy is measured and assigned a token value. The token value contains the quantity of the energy generated, time and a unique identifier of the node. The node uses this token information to create a self-executing, smart contract that is deployed to the network. The smart contract is released to the network and looks for one or more counterparties on the network which match the requirements to execute. The smart contract can find an ultimate buyer or peer to sell the value represented in the token as well as to transfer the energy and other token values across the network between buying and selling peers. Once the counterparties are located and contract terms are settled, the transaction can be recorded to the blockchain ledger and a value can be exchanged via the token between the nodes that have transacted.

SUMMARY

An aspect relates to a method that enables a more reliable method for issuing green energy certificates which are proof against manipulating. It is a further aspect to provide an apparatus which is adapted to carry out a method according to embodiments of the invention.

Embodiments of the invention provide a method for computer-implemented monitoring of energy production of a renewable energy generating system. The renewable energy generating system comprises one or a group of more renewable energy generators. A renewable energy generator may be, for example, a wind turbine or a photovoltaic system. In case of a plurality of wind turbines, the renewable energy generating system may be a windfarm. In case of a plurality of photovoltaic systems, the renewable energy generating system may be a photovoltaic plant.

During the operating of the renewable energy generating system for a predetermined period of time, the following steps are performed one after the other:

As a first step, a produced energy amount of the renewable energy generating system in the predetermined period of time is determined by a first energy meter. The first energy meter may be any suitable measurement equipment or device, which can be, for example, provided by the manufacturer of the renewable energy generator.

As a next step, the produced energy amount of the renewable energy generating system in the predetermined period of time is verified by an independent instance. Verifying the produced energy amount of the renewable energy generating system comprises doublechecking whether the determined produced energy amount of the first energy meter is correct.

As a further step, an energy certificate for the renewable energy generating system for the predetermined period of time is issued by a computing unit. The energy certificate at least comprises a time stamp indicating the predetermined period of time, an identifier indicating the one or the group of renewable energy generators having produced the energy amount, and the produced energy amount.

In a further step, the energy certificate is encrypted by the computing unit.

As a final step, the encrypted energy certificate is added to a block of a blockchain or a distributed ledger application as a digital output.

The method according to embodiments of the invention enables issuing a green energy certificate as a Guarantee of Origin (GoO) for a specific energy generating unit at an arbitrary aggregation level. The certificate can be issued for a single renewable energy generator or a group of renewable energy generators. By using a blockchain or any other distributed ledger application and the computing unit, which is part of the energy generating system and therefore close to the renewable energy generating system, it is possible to create certificates of green energy origin that are trustworthy and immutable. Such certificates can be traced back to a single renewable energy generator or a group of more renewable energy generators.

In contrast to current green energy certificates which are issued to customers by a utility, it is now possible to have a peer-to-peer network without having any entity in between the customer and the producer of the renewable energy. However, in case of regulatory reasons, it is possible to have a regulating entity being able to review and audit the transaction of the certificate by being part of the blockchain network.

As a further advantage, each renewable energy generator or group of generators is able to issue an energy certificate worth the energy it generates continuously. To ensure a high accuracy, the produced energy determined by the first energy meter is verified by an independent instance. "Independent instance" is to be understood, that the verification of the produced energy amount is made by means of an instance—e.g. a device or controller—which is different from the first energy meter or meters.

In an embodiment of the invention, the step of determining the produced energy amount comprises determining a produced energy amount of each of the renewable energy generators by a respective first energy meter, installed at each of the renewable energy generators. Alternatively, or additionally, the step of determining the produced energy amount comprises determining a produced energy amount of the group of more renewable energy generators by the first meter, installed a grid connection point of the group of the renewable energy generators.

Locating a respective first energy meter at each of the renewable energy generators enables to issue an energy certificate for a specific renewable energy generator. Installing the first meter at a grid connection point of the group of the renewable energy generators enables issuing a certificate for a group of renewable energy generators thereby using a reduced amount of energy meters.

In another embodiment, the step of verifying the produced energy amount comprises determining, by a second energy meter installed at each of the renewable energy generators, a produced energy amount in the predetermined period of time and determining a deviation from the produced energy amount determined with the first energy meter.

In another embodiment, the step of verifying the produced energy amount comprises determining, by a second energy meter installed at a grid connection point of the group of renewable energy generators, a produced energy amount in the predetermined period of time and determining a deviation from the sum of produced energy amount determined with the first energy meters of the group of renewable energy generators installed at each of the renewable generators or determining a deviation from the produced energy amount determined with a first energy meter installed at a grid connection point of the group of renewable energy generators.

It is desired that the second energy meter or meters is or are different from the first energy meter or meters. In an embodiment, the technology used for metering energy is different. While the first energy meter or meters may be a measurement equipment provided by the manufacturer of the renewable energy generators, the second energy meter may be an independent measurement equipment or device.

In a further embodiment, the step of verifying the produced energy amount in the predetermined period of time is carried out before issuing the energy certificate. In an alternative embodiment, the step of verifying the produced energy amount in the predetermined period of time may be carried out after encrypting the energy certificate.

It is desired when the energy certificate is only issued if the verification of the produced energy amount is positive. In particular, the energy certificate may be only issued if the deviation between the determined produced energy by means of the first energy meter and the verification, in particular by means of the second energy meter, determined is below a predetermined threshold. In other words, the certificate is only issued if the deviation between the two independent measurements is small. In that case, the two independent measurements match, and a certificate is issued.

In another embodiment, the predetermined period of time is in an interval ranging from 1 minute to 60 minutes, 5 minutes to 30 minutes, or 10 minutes or 15 minutes. A 10 minute time interval corresponds to the default averaging period for a wind turbine SCADA system which might be used as a first energy meter. The 15 minutes interval is a typical default averaging period of utilities trading certificates between energy producers and customers.

In another embodiment, encrypting the energy certificate is based on an asymmetric cryptographic procedure. However, any other encrypting system might be used as well. Using asymmetric encryption systems enables using the well-known private-public key procedures.

In another embodiment, the blockchain or distributed ledger application is configured such that access is granted to permissioned parties only. In other words, a private blockchain or distributed ledger application is suggested in which, for example the customer, the certificate issuer and a regulator for reviewing and auditing the transaction may be permissioned to access the blockchain or ledger application.

Besides the above method, embodiments of the invention refer to an apparatus for computer-implemented monitoring of energy production of a renewable energy generating system where the apparatus comprises a computing unit configured to form the method or one or more embodiments of the method according to the invention.

Moreover, embodiments of the invention refer to a renewable energy generating system comprising one or a group of more renewable energy generators, wherein the renewable energy generating system comprises an apparatus which is configured to perform the method or one or more embodiments of the method according to the invention.

Furthermore, embodiments of the invention refer to a computer program product (non-transitory computer readable storage medium having instructions, which when executed by a processor, perform actions) with program code, which is stored on a non-transitory machine-readable carrier, for carrying out the method according to the invention or one or more embodiments thereof when the program code is executed on a computer.

BRIEF DESCRIPTION

Some of the embodiments will be described in detail, with reference to the following figures, wherein like designations denote like members, wherein.

DETAILED DESCRIPTION

Figure 1:
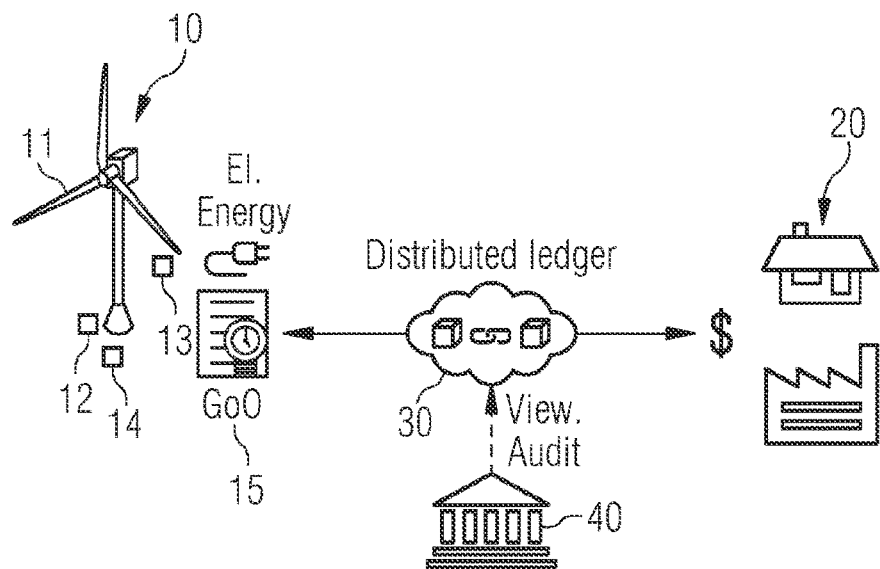
FIG. 1 is a schematic illustration of a transaction between an entity comprising a renewable energy generating system and issuing a trustworthy energy certificate in a peer-to-peer transaction to a customer.

FIG. 1 shows a schematic diagram illustrating a renewable energy generating system 10 which is able to issue an energy certificate 15 (also called Guarantee of Origin (GoO)) worth the energy it has generated in a predetermined period of time. The energy certificate 15 can be transferred directly (i.e., peer-to-peer) to a customer 20 by encrypting the energy certificate 15 and adding the encrypted energy certificate 15 to a block of a blockchain 30 or any other distributed ledger application. Issuing the energy certificate 15, encrypting the energy certificate 15 and adding the encrypted energy certificate 15 to a block of a blockchain 30 is carried out by one or more computing units 14 of the renewable energy generating system 10.

The energy generating system 10 consists of one renewable energy generator or a group of more renewable energy generators. The renewable energy generating system may be the windfarm consisting of one or a plurality of wind turbines as renewable energy generators or a photovoltaic power plant consisting of one or a plurality of photovoltaic systems. In FIG. 1, a single wind turbine is representing an arbitrary number of renewable energy generators 11 of the energy generating system.

Issuing the energy certificate 15 for the renewable energy generating system 10 will be performed, during the operation of the renewable energy generating system, for a predetermined period of time. For example, the energy certificate 15 will be issued for each 10 minutes or 15 minutes time period during the operation of the renewable energy generating system 10. The energy certificate 15 may be issued for a specific renewable energy generator 11 or the renewable energy generating system 10 as a whole.

As each energy certificate 15 is issued worth the energy the renewable energy generator(s) 11 or the renewable energy generating system 10 (depending on the wished aggregation level) it has/have generated for the predetermined period of time, the produced energy amount of the renewable energy generating system 10 or renewable energy generator(s) in the predetermined period of time is determined. This may be done by a first energy meter 12, which is, for example, provided by the manufacturer of the renewable energy generator(s) 11. In particular, a respective energy meter 12 is installed at each of the renewable energy generators 11. Before issuing the energy certificate for the produced energy for a specific predetermined period of time, the produced energy amount of the renewable energy generator 11 or the renewable energy generating system 10 is verified.

The step of verifying the produced energy amount may be done by a second energy meter 13 which is installed, for example, at each of the renewable energy generators 11. The second energy meter 13 is a different energy meter compared to the first energy meter 12. It may be based on the same or a different measurement technology compared to the first energy meter. By comparing the produced energies determined from the first and the second energy meters a deviation can be determined for a desired aggregation level. If the deviation is within a predetermined range, then the energy certificate 15 will be issued by the computing unit 14.

If the energy certificate 15 is issued for each single renewable energy generator 11, a comparison of the produced energies determined by the first and the second energy meters 12, 13, both of them being installed at the renewable energy generator 11, is made.

If the energy certificate 15 will be issued for a group of more renewable energy generators, the second energy meter 13 may be installed at a grid connection point (not shown) of the group of renewable energy generators 11. In case that every single renewable energy generator 11 is equipped with a first energy meter, the sum of produced energy amounts determined with all of the first energy meters 12 of the group of renewable energy generators 11 is determined and this sum is compared to the measurement of the second energy meter 13. In an alternative of this constellation, only a single first energy meter 11 might be installed at the grid connection point of the group of renewable energy generators 11. If the deviation determined is within a predetermined range, i.e., small enough, meaning that the measurements of the first and the second energy meters 12, 13 match, the energy certificate 15 will be issued for the group of renewable energy generators 11. Small enough comprises, for example, a deviation smaller than 1%.

The issued energy certificate 15 will be encrypted by the computing unit 14 with asymmetric encryption. The computing unit 14 represents a certificate issuing device. The computing unit 14 may make use of a private and a public key pair with a unified identification of the renewable energy generator. Then, a block of a blockchain 30 is created and uploaded to the blockchain 30 or any other distributed ledger. Creation of the block may be made by the computing unit 14 or a different computing unit. The energy certificate's value has an equal size to the generated electrical energy production of the generator.

The first and/or second energy meters 12, 13 are located in the renewable energy generators 11. As described above, at least the second energy meter 13 may be located at a grid connection point.

According to the location of the first and/or second energy meters 12, 13, the origin of the energy certificate 15 can be a single renewable energy generator or a group of renewable energy generators of the renewable energy generating system 10. In case of a group of energy generators 11, the grid connection point might be chosen for measuring the energy production.

The data for produced energy may be taken from an independent smart autonomous meter of the renewable energy generators 11. In particular, the first energy meter 12 may be the SCADA system or a condition monitoring system (CMS) of the renewable energy generator 11.

Alternatively, data might be acquired by a dedicated measurement system, developed for this specific purpose.

The produced energy in the predetermined time interval may be averaged over this period. In an embodiment, the produced energy is averaged over 10 minutes or 15 minutes.

The produced energy for a defined aggregation level and the respective averaging period may be encrypted. In an embodiment, a public-private key procedure is used.

Different levels of deviation between the determined produced energy amounts of the first and the second energy meters may be used. For measurements within a very precise first energy meter 12 very small deviations are accepted. For measurements at a grid connection point higher deviations may be acceptable taking into account grid losses from the units to the grid connection point.

The energy certificate at least comprises a time stamp indicating the predetermined period of time, an identifier indicating the one or group of renewable energy generators 11 having produced the energy amount, and the produced energy amount. More detailed, the following parameters may be part of the energy certificate 15:

| Parameter | Value |
| --- | --- |
| Unit ID(s) | ID(s) of the unit |
| Timestamp (start and end date/time of production) | current timestamp |
| Energy source | Type of renewable energy source (e.g., wind turbine generator) |
| Form of energy | e.g., electricity, heating, cooling |
| Location | Location of renewable energy generator |
| Type | Renewable energy generation identifier |
| Capacity | Nameplate capacity of unit |
| Unique identification number | Certificate ID |
| Production | Produced energy for the given timestamp and period |

When adding the encrypted and signed energy certificate 15 to a block of the blockchain 30, the previous and the current hash value are added. The hash value of the previous block is required for linking the blocks together. The current hash is the hash value of the current block.

In an embodiment, a private blockchain or distributed ledger is used which only grants access to permission parties. Permissioned parties are, besides the energy provider and the customer 20, a potential auditing unit 40 which needs to review and audit the transaction of the energy certificate 15. In this regard, only certified parties shall be able to create a new block of the blockchain 30. In this way, it can be ensured that only valid green energy certificates 15 are issued. Thus, proof of authority will be applied.

Figure 2:
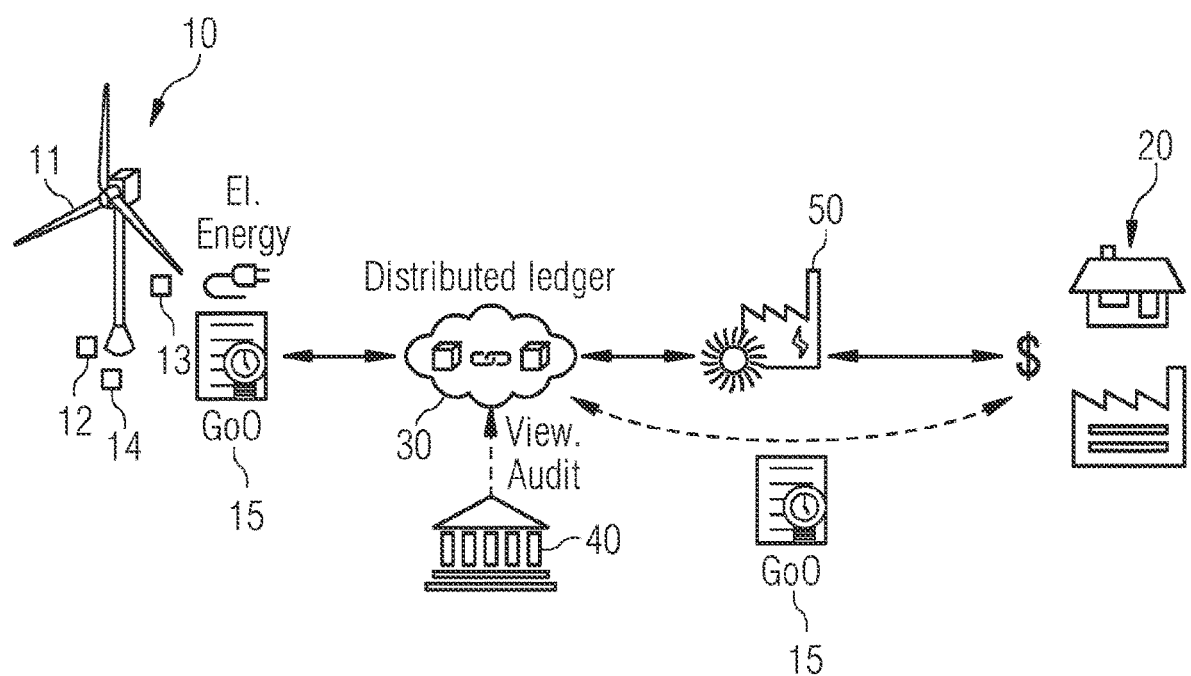
FIG. 2 is a schematic illustration of a transaction between an entity comprising a renewable energy generating system and issuing a trustworthy energy certificate in a utility dominated configuration to a customer.

FIG. 2 shows an alternative embodiment, in which the energy certificate 15 is added to a blockchain 30. The energy certificate 15 may be provided for the customer 20 directly while further transaction steps may be made by a utility (a trading company) 50.

Figure 3:
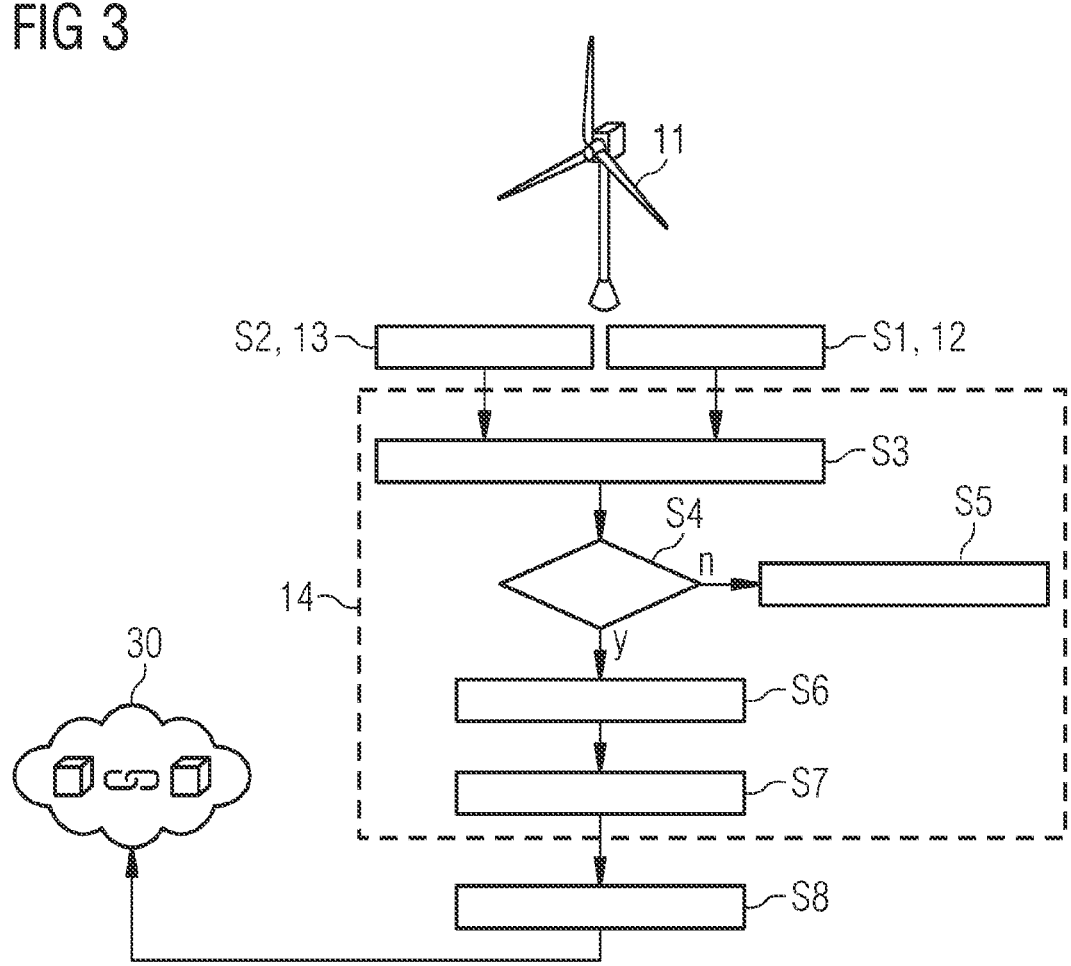
FIG. 3 shows a flowchart of issuing an energy certificate according to a first embodiment of the invention.

FIG. 3 shows a flowchart of generating an energy certificate 15 according to a first embodiment. In step S1, a produced energy amount of the renewable energy generator 11 (representing an energy generating system in this example) is determined by the first energy meter 12 for the predetermined period of time, e.g., 10 minutes or 15 minutes. In step S2, an independent energy meter measures the produced energy amount for the same predetermined time interval. Steps S1 and S2 are conducted in parallel at the same time. In step S3, a deviation between the produced energy amounts determined by the first and the second energy meters 12, 13 is calculated. This deviation verification is conducted by the computing unit 14 acting as a certificate issuing device. In step S4, it is verified whether the deviation is acceptable. If the deviation between the produced energy amounts measured by the first and the second energy meters 12, 13 is too big, i.e., lying without a predetermined range (path "n"), step S5 decides for manipulation or a measurement error. The flowchart ends without issuing an energy certificate. If the deviation is small, i.e., the difference between the produced energy amounts measured by the first and the second energy meters 12, 13 is within a predetermined range (path "y"), an energy certificate 15 is issued in step S6. As described above, the energy certificate 15 at least comprises a time stamp indicating the predetermined period of time, an identifier indicating the renewable energy generator 11 having produced the energy amount, and the produced energy amount. In addition, the aforementioned parameters of table 1 may be added to the energy certificate 15. As a next step, the energy certificate 15 is added with a digital signature to ensure the authenticity and integrity of the data. The computing unit creates a one-way hash of the data to be signed. The private key may then be used to encrypt the hash value. This encrypted hash value, plus other information like the hashing algorithm used, represents the digital signature. The digital signature corresponds to encrypting the energy certificate, as outlined in step S7. In step S8, a block in the blockchain is created and added to the blockchain 30.

Figure 4:
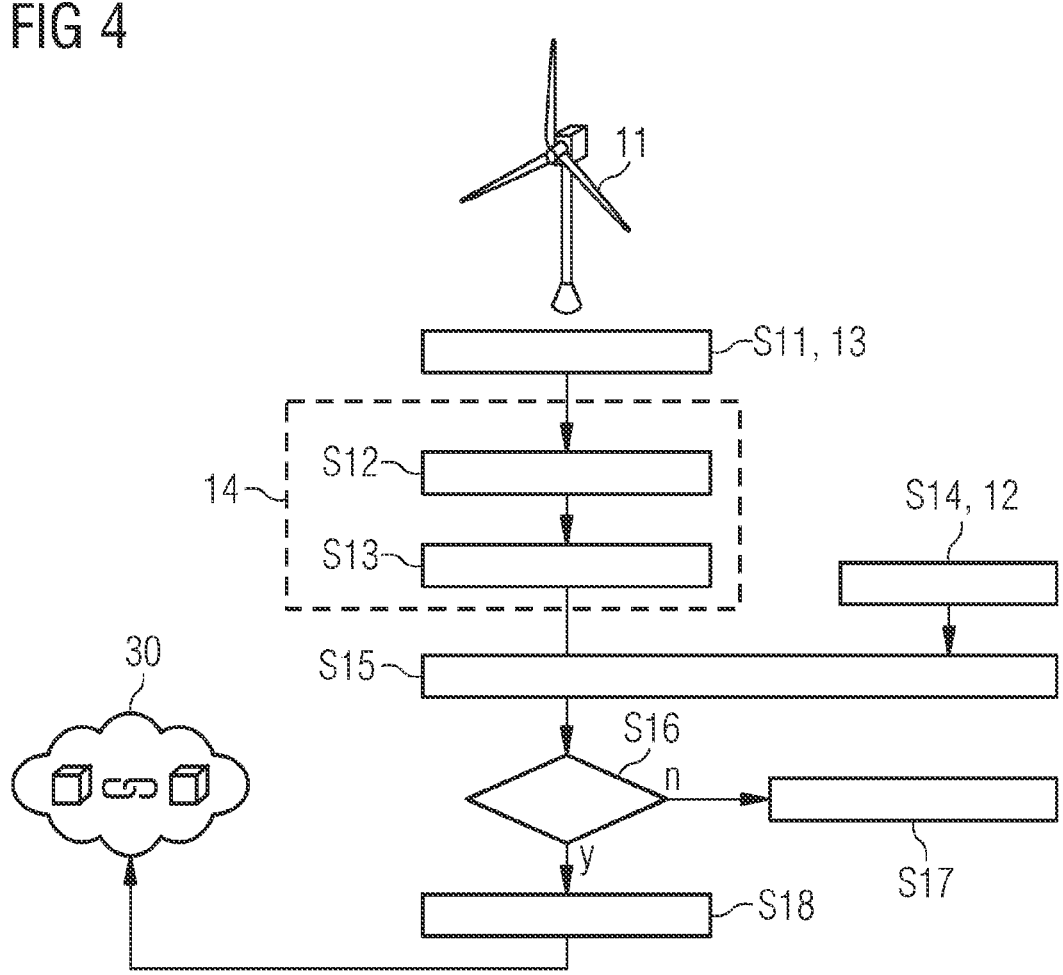
FIG. 4 shows a flowchart of issuing an energy certificate according to a second embodiment of the invention.

FIG. 4 shows an alternative flowchart. In step S11, the produced energy amount for a predetermined period of time is measured by, for example, the second energy meter 13. In step S12, the energy certificate 15 is issued. In step S13, the energy certificate is added with a digital signature, i.e., it is encrypted. Steps S12 and S13 are carried out by the computing unit 14 acting as the certificate issuing device. Parallel to measuring the produced energy amount by the second energy meter 13, the energy amount is measured by the first energy meter 12 in step S14. In step S15, the deviation verification is made. In step S16, it is verified, whether the deviation is acceptable (path "y" or path "n"). If the deviation is not acceptable (path "n"), in step S17, a measurement error or manipulation is assumed. If the deviation is small (path "y"), in step S18, a block in the distributed ledger or blockchain is created and added to the blockchain 30.

The energy certificates are now directly connected to the produced energy amount. A relabeling of energy is prevented. Energy certificates are tradable from the renewable generator directly to the customer which decreases cost. An efficiency improvement through the automatic handling, trading and settlement of the certificates may be achieved. The method described works in systems with or without utilities. Energy certificates are immutable and trustworthy through blockchain technology. Certifying that consumed energy is generated from renewable sources may potentially reduce cost of grid usage and levies for customers.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for computer-implemented monitoring of energy production of a renewable energy generating system, where the renewable energy generating system comprises one or a group of more renewable energy generators, wherein during the operation of the renewable energy generating system for a predetermined period of time the following steps are performed:
   determining, by a first energy meter, a produced energy amount of the renewable energy generating system in the predetermined period of time, wherein the step of determining the produced energy amount comprises
      determining a produced energy amount of each of the renewable energy generators by a respective first energy meter, installed at each of the renewable energy generators; and/or
      determining a produced energy amount of the group of more renewable energy generators, by the first energy meter, installed at a grid connection point of the group of the renewable energy generators;
   verifying the produced energy amount of the renewable energy generating system in the predetermined period of time based on a second energy meter different from the first energy meter, wherein the step of verifying the produced energy amount comprises
      determining, by a second energy meter installed at each of the renewable energy generators, a produced energy amount in the predetermined period of time and determining a deviation from the produced energy amount determined with the first energy meter; and/or
      determining, by a second energy meter installed at the grid connection point of the group of renewable energy generators, a produced energy amount in the predetermined period of time and determining a deviation from the sum of produced energy amount determined with the first energy meters of the group of renewable energy generators installed at each of the renewable generators or determining a deviation from the produced energy amount determined with the first energy meter installed at the grid connection point of the group of renewable energy generators;

identifying, by a computing unit, manipulation and/or a measurement error when the determined deviation exceeds a predetermined threshold;

issuing, by the computing unit, an energy certificate for the renewable energy generating system for the predetermined period of time, where the energy certificate at least comprises a time stamp indicating the predetermined period of time, an identifier indicating the one or group of renewable energy generators having produced the energy amount, and the produced energy amount when a verification of the produced energy amount is positive;

encrypting, by the computing unit, the energy certificate; and adding, by the computing unit, the encrypted energy certificate to a block of a blockchain or a distributed ledger application as a digital output.

2. The method according to claim 1, wherein the step of verifying the produced energy amount in the predetermined period of time is carried out before issuing the energy certificate.

3. The method according to claim 1, wherein the step of verifying the produced energy amount in the predetermined period of time is carried out after encrypting the energy certificate.

4. The method according to claim 1, wherein the energy certificate is only issued if the deviation determined is below the predetermined threshold.

5. The method according to claim 1, wherein the amount of produced energy is averaged over the predetermined period of time.

6. The method according to claim 1, wherein the predetermined period of time is in an interval ranging from 1 minute to 60 minutes, 5 minutes to 30 minutes, or 10 minutes or 15 minutes.

7. The method according to claim 1, wherein encrypting the energy certificate is based on an asymmetric cryptographic procedure.

8. The method according to claim 1, wherein encrypting the energy certificate comprises adding a digital signature.

9. The method according to claim 1, wherein the blockchain or distributed ledger application is configured such that access is granted to permissioned parties only.

10. An apparatus for computer-implemented monitoring of energy production of a renewable energy generating system, where the renewable energy generating system comprises one or a group of more renewable energy generators, wherein the apparatus comprises a computing unit configured to perform the following steps one after the other during the operation of the renewable energy generating system for a predetermined period:

receiving, at an interface, a produced energy amount of the renewable energy generating system in the predetermined period of time which has been determined by a first energy meter;

verifying the produced energy amount of the renewable energy generating system of the renewable energy generating system in the predetermined period of time based on a second energy meter different from the first energy meter, wherein the step of verifying the produced energy amount comprises determining, by a second energy meter installed at each of the renewable energy generators, a produced energy amount in the predetermined period of time and determining a deviation from the produced energy amount determined with the first energy meter; and/or determining, by a second energy meter installed at the grid connection point of the group of renewable energy generators, a produced energy amount in the predetermined period of time and determining a deviation from the sum of produced energy amount determined with the first energy meters of the group of renewable energy generators installed at each of the renewable generators or determining a deviation from the produced energy amount determined with the first energy meter installed at the grid connection point of the group of renewable energy generators;

identifying manipulation and/or a measurement error when the determined deviation exceeds a predetermined threshold;

issuing an energy certificate for the renewable energy generating system for the predetermined period of time, where the energy certificate at least comprises a time stamp indicating the predetermined period of time, an identifier indicating the one or group of renewable energy generators having produced the energy amount, and the produced energy amount when a verification of the produced energy amount is positive;

encrypting the energy certificate; and adding the encrypted energy certificate to a block of a blockchain or a distributed ledger application as a digital output.

11. The apparatus according to claim 10, wherein the apparatus is configured to perform a method.

12. A renewable energy generating system, comprising one or a group of more renewable energy generators, wherein the renewable energy generating system comprises an apparatus according to claim 10.

13. A computer program product with program code, which is stored on a non-transitory machine-readable carrier, for carrying out a method according to claim 1 when the program code is executed on a computer.

* * * * *